Patented Mar. 3, 1953

2,630,440

UNITED STATES PATENT OFFICE 2,630,440

COMPOUNDS FOR ALTERING SURFACE CHARACTERISTICS OF LIQUIDS

Lewis O. Gunderson, Park Ridge, Ill., assignor to Dearborn Chemical Company, Chicago, Ill., a corporation of Illinois No Drawing. Application September 15, 1949, Serial No. 115,947

15 Claims. (Cl. 260—404.5)

The present invention relates to a method for conditioning water for the prevention of foaming, and to compositions adapted to be dispersed in systems having a tendency to foam.

In particular, the invention relates to a method for conditioning water in the prevention or reduction of foaming in boilers, for the prevention or reduction of moisture entrainment in the steam generated in the boilers, for increasing the coefficient of heat transfer in boilers, cooling equipment and heat exchange systems without producing a foaming condition, and for generally improving the character of water for use in steam boilers, heat exchange systems and the like.

Foaming of boiler water is not, as commonly thought, equivalent to an accumulation of foam on top of the surface of boiling water as may occur, for instance when soap solutions are agitated. The foam or froth obtainable by blowing air through or by stirring a soap solution accumulates on top of the water surface and present a distinct water-froth interface. Such froth is the result of an equilibrium arrived at after a considerable time as a result of the interplay of various factors, such as surface tension, forces tending to establish the more or less organized surface layer, preferential adsorption and the like, and this interaction leads to the formation of relatively stable froth.

The development of foam in a liquid system being heated, however, may be due to the development of numerous gas or vapor nuclei on the hydrophobic surfaces of particles of matter suspended in the liquid and/or absorbed on the heating surface. Normally, such numerous small bubbles will resist coalescence while rising through the liquid and will remain stable after reaching the liquid surface where it forms a layer of froth or foam.

The compositions and methods of the present invention will effectively bring about a pronounced decrease in the number of gas and vapor nuclei, and at the same time, the molecules of the compounds of the present invention will rapidly spread out in the vapor-liquid interface and bubble film to disrupt the stabilizing forces, thus causing the immediate collapse of such vapor bubbles and destroying the froth or foam formation.

The foaming of boiler water, on the other hand, is due to the formation of a large number of steam bubble nuclei on the heating surface which generates numerous small steam bubbles having the property of resisting coalescence while rising through the boiling water. The formation of such a large number of relatively small bubbles tends to expand the volume of water without necessarily effecting the formation of a layer of stable froth on top of the boiling water. Further, a water that forms a froth on agitation or blowing of air therethrough does not necessarily always foam or expand on boiling.

A differentiation may be made between the terms "foam inhibition" and "defoaming." "Foam inhibition" includes instances where a compound or substance when added to a liquid inhibits the initiation of foam formation, while "defoaming" applies where a compound when added to a solution already in a foaming condition effectively destroys or collapses such foam. Some compounds often are effective only as defoaming agents, that is, foam destroyers, while others act as true foam inhibitors, preventing even the initial formation of foam, while still others can act both as defoamers and foam inhibitors. Many of the compounds proposed by the present invention are of the latter type in that they act both as defoamers and foam inhibitors.

The foaming of boiler water is actually a rapid expansion of a water in the steam generating area of the boiler brought about by the fact that rapidly forming, small steam bubbles resist coalescence, and, therefore, accumulate in the water to form in effect a steam-bubble-expanded water. Small hydrophobic particles dispersed throughout the body of boiler water or adsorbed on the heating surface may act as nuclei, promoting the formation of bubbles, particularly when the pressure is suddenly lowered as large amounts of steam are suddenly withdrawn from the boiler. As a consequence, the entire volume of water in the generating area is expanded by myriads of bubbles until the thus formed "light" water may fill the steam space or become entrained with the high velocity steam, leaving the boiler from the restricted steam space. This "light" water carryover presents difficulties in that it causes encrustation in the subsequent components of the boiler system.

Operation of evaporators for the production of feed water for boilers, especially on sea going vessels is constantly confronted with carry-over problems resulting in the contamination of the boiler feed water with disastrous results. The concentration of ocean water salines in the evaporator also causes precipitation of calcium and magnesium salts therein which tend to stabilize foam. The compounds of the present invention are very suitable for dispersion in such evaporators to inhibit the formation of foam and thus avoiding the carryover problem.

Another problem is presented by the foaming of water in processes of paper manufacture. The compounds of the present invention are also suitable for inhibiting foaming in such systems operating under atmospheric pressure.

An object of the present invention is to provide a method for inhibiting the tendency of aqueous systems to foam.

A further object of the invention is to prevent foam formation in aqueous or non-aqueous systems wherein foaming is encountered due to the generation of steam under atmospheric or low pressure condition, wherein foaming is due to agitation and entrainment of air in the system due to turbulence or other agitation, and wherein foam formation is due to aeration of liquid systems, and the like.

A further object of the present invention is to provide novel compositions which are suitable for use in systems which have tendencies to foam both at sub-atmospheric and super-atmospheric pressures.

Another important object of the present invention is to provide a method of treating water to prevent foaming or expansion on boiling and to prevent the entrainment of foam with the steam leaving the boiler.

One method of the present invention comprises dispersing into water which has a tendency to foam a composition comprising a compound having a plurality of alkylene-oxy linkages and containing at least one long hydrocarbon chain attached to the $\alpha$ and $\omega$ polar radicals. Any intermediate acetal linkage may or may not have a substituent long hydrocarbon chain.

By the term "alkylene-oxy" as used in the present application, I mean that group which may be represented by the formula —RO— where R is an alkylene group such as the ethylene or propylene group.

The preferred products of the present invention have a molecular weight of at least 1,500, and preferably, a molecular weight in the range from 3,000 to 7,000 or more.

As the first step in the preparation of the compounds of the present invention, an alkylene oxide such as ethylene oxide and/or iso-propylene oxide is reacted with a compound having a high molecular weight polar radical.

Typical polar radicals are the following:

RO—
RNH—
$R_2$N—
RCONH—
RCOO—
RCONHC$_2$H$_4$NH—
(RCONHC$_2$H$_4$)$_2$N—
RCONHC$_2$H$_4$NHC$_2$H$_4$NH—
RCONHC$_2$H$_4$NCOR—

RCONHC$_2$H$_4$NC$_2$H$_4$NH—
           |
          COR

RCONHC$_2$H$_4$NCORC$_2$H$_4$N(C$_2$H$_4$NHCOR)—
RS—

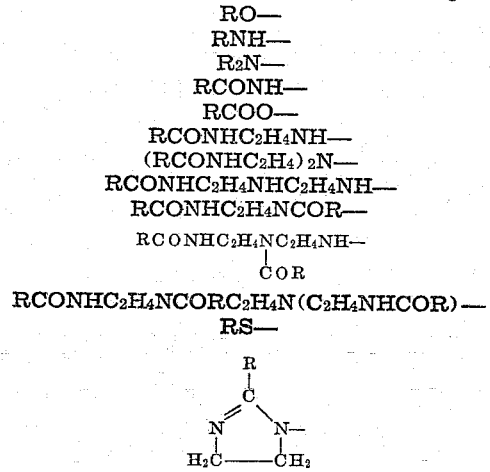

The unattached valence appearing in the above groups is preferably attached to a reactive hydrogen atom.

In the preceding examples, R represents a hydrocarbon chain of at least 4 carbon atoms, and preferably, one of at least 11 carbon atoms.

Compounds containing the above high molecular weight radicals may be condensed with at least 2, and preferably, 25 to 40 or more moles of ethylene oxide, propylene oxide, glycidol, or a mixture of formaldehyde and ethylene oxide or propylene oxide, or other reagents capable of producing poly oxy ethyl or methyl ethers. Two moles of the resulting high molecular weight, polyalkyloxy derivatives, are then condensed with one mole of an aldehyde such as acetaldehyde, furfural, aldol, 3,5,5,-trimethyl hexaldehyde, glyoxal, stearaldehyde, etc., to produce the acetal compounds of this invention. Examples of the compounds thus produced are represented by the following formulae:

(1) $$H_{\phantom{1}} \qquad\qquad\qquad\qquad H$$
$$C_{16}H_{33}N(-C_2H_4O-CH(CH_3)CH_2-O-)_n-CH-(OC_2H_4-O-CH(CH_3)CH_2)_nNC_{16}H_{33}$$
$$\phantom{C_{16}H_{33}N(-C_2H_4O-CH(CH_3)CH_2-O-)_n-}C_{11}H_{23}$$

(2)
$$C_{11}H_{23}CONH\left[-CH(CH_3)CH_2O-\right]_n-CH-(OCH(CH_3)CH_2)_nNHCOC_{11}H_{23}$$
$$\phantom{C_{11}H_{23}CONH\left[-CH(CH_3)CH_2O-\right]_n-}C_{15}H_{31}$$

(3)
$$C_{17}H_{35}-CONH-C_2H_4-NH(C_2H_4O)_n-CH-(OC_2H_4)_nNH-C_2H_4NHCOC_{17}H_{35}$$
$$\phantom{C_{17}H_{35}-CONH-C_2H_4-NH(C_2H_4O)_n-}C_6H_{13}$$

(4)
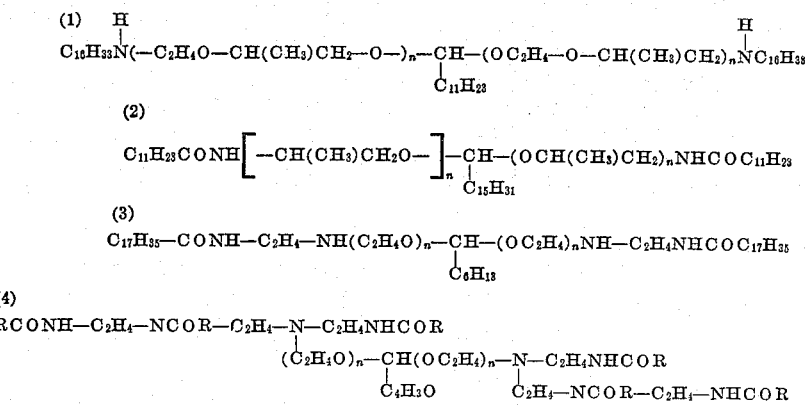

where R is a naphthenic acid residue.

(5) $$C_{12}H_{25}S(C_2H_4O)_n-CH-(OC_2H_4)_nSC_{12}H_{25}$$
$$\phantom{C_{12}H_{25}S(C_2H_4O)_n-}C_4H_3O$$

wherein $n=2$ or more.

(6) $$\phantom{C_4H_9O(R'O)_n-}C_8H_{17}$$
$$C_4H_9O(R'O)_n-CH-(OR')_n-OC_4H_9$$

where $R'=C_2H_4$ or $CH(CH_3)CH_2$.

It is specifically to be understood that in the polymeric occurrence of the $C_2H_4$ or the $CH(CH_3)CH_2$ radicals in formulae reproduced herein, either radical can be substituted for the other and that both radicals may appear alternately or in mixed fashion in any polymeric polyalkyloxy chain present in any compound described herein.

(7)

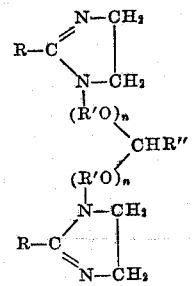

where

R = naphthenic acid
R' = $C_2H_4$ or $CH(CH_3)CH_2$
R'' = an alkyl radical.

In addition, valuable anti-foam compounds may be prepared by condensing with the aid of an aldehyde such as furfural, any one of the high molecular weight compounds with a high molecular weight polyglycol having a molecular weight of at least 1,000, but preferably, of at least 2,000. The condensation may also be carried out with a monoether of such polyglycol as, for example, with the polyglycol monoether known as "Ucon" –50–HB–3520. As an example of such a preparation, one mole of distearoyl diethylene triamine was thoroughly mixed with one mole of polyglycol monoether having an approximate molecular weight of 3,500. The reaction kettle was heated to a temperature in the range from 60° to 160° C. with the addition of one mole of butyraldehyde, and heating and stirring were continued until the reaction was completed. The resulting compound was a very effective foam inhibitor. The following formula is believed to represent the molecular structure of the compound formed:

(8)

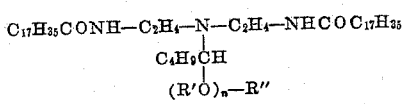

The products resulting from the above noted condensations, which contain a plurality of interlinked alkylene-oxy linkages and a terminal hydroxy group are further reacted to improve their foam inhibiting properties. For example, the terminal hydroxy group may be reacted with fatty acid or a mono- or di- carboxylic acid to esterify the terminal hydroxy group. In addition, the hydroxyl group may be etherified. Where high molecular weight compounds having a molecular weight of over 3,000 or more are produced, the solubility characteristics of the compound may be improved by sulfating or sulfonating the terminal hydroxyl group.

Examples of the compounds resulting from further reaction of the high molecular weight alkylene-oxy compounds are given below. In each of the following examples, $n$ is equal to at least 2 and preferably, at least 25:

(9)  $C_{18}H_{37}NH-(C_2H_4O-)_nC_2H_4OOCC_{17}H_{35}$ (10)

(11)  $C_{17}H_{35}CONH-C_2H_4-NH(C_2H_4O-)_nC_2H_4OOCC_{17}H_{35}$

(12)  $C_8H_{17}O(C_2H_4O-)_nC_2H_4OOCC_{11}H_{23}$

(13)  $C_4H_9O(C_2H_4O-)_nC_2H_4OOCC_{17}H_{35}$

(14)  $C_6H_5(C_2H_4O)_2(C_2H_4O)_nC_2H_4OOCC_{15}H_{31}$ (15)

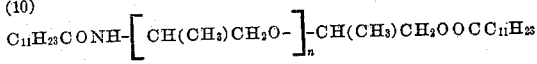

(16)

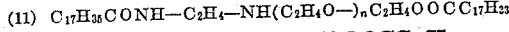

(17)

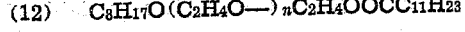

In all of the preceding examples, the propylene oxide radical may replace the ethylene oxide radical in whole or in part, depending upon whether lesser or greater water solubility is desired, the greater the replacement with propylene oxide the lesser the water solubility.

Other novel compounds within the scope of the present invention are obtained by reacting 2 moles of any of the previously described alkyleneoxy compounds with one mole of an aldehyde, such as acetaldehyde, furfural, glyoxal, butyraldehyde, heptaldehyde, nonylaldehyde, and the like. For most uses, the aldehyde should have at least 8 carbon atoms. The resulting acetaltype compound will have approximately twice the molecular weight of the original poly oxy ethyl ether compound. Examples of the preparation of this type of compound are given below. In these examples, reaction temperatures of 80° to 200° C. or above were employed, and a strongly alkaline catalyst such as dry sodium hydroxide was used to condense the various amines, amides, and sulfides with the alkylene oxides.

*Example I*

1 molecular proportion of a primary amine, such as cetyl amine, was reacted with at least 25 moles of ethylene and/or propylene oxide to form the poly oxy ethyl-propyl ethanol cetyl amine. Thereupon, the reaction product was condensed with a branch chain aldehyde, such as nonylaldehyde, (3,5,5 - trimethylhexylaldehyde) to produce a compound having probably the following structure:

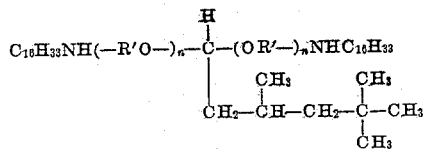

where $n$ is an integer of at least 2, and $(-R'-)_n$ means either an ethyl or an iso-propyl radical or mixtures thereof.

*Example II*

1 molecular proportion of mono-propanol amine was condensed with 1 mole of lauric acid at approximately 175° C. for 4 hours to produce the mono-amide, and the reaction product was reacted with 40 moles of propylene oxide at temperatures in the vicinity of 150° C. and in the presence of dry sodium hydroxide. The resulting product was a high molecular weight poly oxy propyl amide propanol derivative. 1 mole of the reaction product was condensed with 1 mole of nonyladehyde to produce the high molecular weight acetal, which proved to be a very versatile foam inhibiting compound.

*Example III*

Amino ethyl ethanol amine was condensed with 1 mole of stearic acid at 165° to 175° C. for 5 hours to produce the mono-amide, which was then reacted with 25 moles of an equi-molar mixture of ethylene oxide and propylene oxide under the conditions given in the previous example to form the poly oxy ethyl propylamide. The resulting reaction product was condensed with butyraldehyde in a mole ratio of 2:1 to form the acetal-type compound.

*Example IV*

The trinaphthenoyl amide of triethylene tetramine (prepared by reacting triethylene tetramine with 3 moles of a naphthenic acid having an acid number above 200) was condensed with 30 moles of ethylene oxide. 2 moles of the resulting product were condensed with 1 mole of furfural to produce the corresponding high molecular weight acetal.

*Example V*

1 mole of lauryl mercaptan was condensed with 40 moles of propylene oxide to produce the poly oxy propylsulfide. The reaction product was then further condensed with ½ mole of glyoxal to produce the acetal, which proved to be a very effective foam inhibiting agent.

In addition, the monoether mixed polyglycol of the type mentioned previously may be condensed with an aldehyde to form the acetal diether compound having the formula:

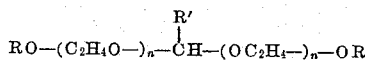

$$RO-(C_2H_4O-)_n-\overset{R'}{\underset{|}{C}}H-(OC_2H_4-)_n-OR$$

where R is an alkyl group containing at least 8 carbon atoms, an aryl group, or an aralkyl radical; R' is the alkyl radical from the corresponding aldehyde; and $n$ is an integer of preferably at least 25.

*Example VI*

1 mole of p-tertiary-amylphenol was reacted with approximately 2 moles of ethylene oxide and propylene oxide in the presence of an alkaline catalyst, in this instance, powdered sodium hydroxide. A temperature of 130° to 160° C. and a pressure of approximately 30 pounds per square inch were maintained during the reaction. 2 moles of the reaction product were then further reacted with 1 mole of furfural to produce the acetal-type compound. The latter condensation was completed after about 5 hours at a temperature of 150° to 160° C. The ultimate reaction product was a very efficient foam inhibitor.

*Example VII*

1 mole of o-dimethylaminomethyl-p-octylphenol was condensed with approximately 5 moles of ethylene oxide in accordance with the methods described in U. S. Patents Nos. 2,448,664 and 2,213,477. The resulting poly oxy alkyl compound was condensed with butyraldehyde to form the acetal having probably the following formula:

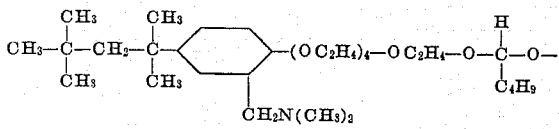

The above compound is also an efficient foam inhibitor.

*Example VIII*

One mole of ethylene diamine and one mole ethylene diamine hydrochloride were condensed with one mole of naphthenic acid, having an acid number of approximately 210 heating the reactants for 1½ to 2 hours at approximately 180° C., when the reaction mass was maintained at 280° C. ±10° C. for another six to eight hours or until the acid number had become approximately constant, or until the reaction product had become soluble in water, indicating that imidazoline had been formed. The reaction product was further reacted with an approximately equimole mixture of ethylene oxide and 1,3 propylene oxide, until a molecular weight of approximately 200 of the alkylene oxide had been added, in accordance with the method described by Roberts, et al., in U. S. Patent 2,425,755. The resulting product was then condensed with acetaldehyde, to form the high molecular weight acetal polyalkyloxy imidazoline.

*Example IX*

Another unique composition effective as an anti-foam and anti-froth material was prepared by reacting together a mixture of an aldehyde and a polyglycol, especially of the type where both the ethyleneoxy and 1,3 propyleneoxy radicals occur in various proportions, and which polyglycols have a high molecular weight of 800 or more, and wherein the ratio of aldehyde to such polyglycol radicals is at least one to two, but preferably one to two or more, in which case also the aldehyde should preferably be of high molecular weight having at least eight carbon atoms, but not necessarily so. Such a compound may be prepared as follows:

Ethylene glycol was condensed with a mixture of ethylene oxide and 1,3 propylene oxide, such as in a 50–50 mixture, to produce a polyalkyloxy glycol having a molecular weight of at least 800, but preferably 1200 or more. Such condensation may be carried out in accordance with U. S. Patent 2,425,755 or U. S. Patent 2,448,664. Such high molecular weight, polyglycol, was then condensed with 3,5,5-trimethyl hexaldehyde in any proportion to produce a polyglycol having molecules interrupted by acetal radicals in spaced relationship in the molecule, such that a complex acetal polyglycol having a molecular weight of 6000 would have one or more, preferably three or more, acetal linkages in the molecule. The probable formula for such a compound is the following:

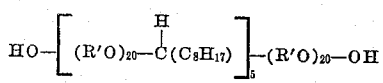

$$HO-\left[(R'O)_{20}-\overset{H}{\underset{|}{C}}(C_8H_{17})\right]_5-(R'O)_{20}-OH$$

This compound is particularly effective as an anti-frothing agent for preventing foaming of furnish water in the paper industry.

*Example X*

A high molecular weight polyglycol (approximately 2500 molecular weight) wherein the ethylene oxide and isopropylene oxide radicals are inter-mixed was reacted with nonylaldehyde (3,5,5-trimethylhexylaldehyde) at a temperature range of 80° to 200° C. in the presence of an acid

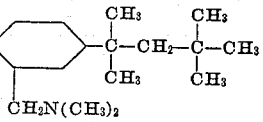

catalyst utilizing a mole ratio of 2:1 to form the acetal substituted glycol having excellent foam inhibiting properties, particularly under atmospheric conditions of pressure and temperature.

*Example XI*

A polyethyleneglycol of molecular weight of approximately 500 was condensed with heptaldehyde in molecular ratio of approximately 3:7 in the presence of an acid catalyst to produce the polyacetal substituted polyglycol. In this reaction the reagents were preliminarily thoroughly and rapidly mixed together and heated to the reaction temperature in excess of 80° C. until the reaction was completed at approximately 200° C., the reaction product being a polyoxy polyacetal high molecular weight compound, with some residual polyglycols and polymerized aldehyde. The reaction mixture is a good foam inhibitor for high pressure boilers and for atmospheric foam inhibition.

Example XII

A poly iso-propylene glycol of molecular weight of approximately 1500 was condensed with nonylaldehyde at 100° to 150° C. with an acid catalyst in mole ratio of 2:1 to produce the acetal substituted glycol having good foam inhibiting properties. In this compound, the central acetal radical has a long hydrocarbon chain, giving the resulting foam inhibiting compound important surface active properties.

Example XIII

The primary stearyl amine was condensed with 30 moles of ethylene oxide in the presence of a solid caustic catalyst to produce the stearyl amine polyalkyloxy ethanol compound which was subsequently condensed with stearic acid to produce the corresponding ester alkyl amine, foam inhibiting compound represented by Formula 9 hereinabove.

Example XIV

Lauroyl amide represented by formula

$C_{11}H_{23}CONH_2$ was condensed with 40 moles of iso-propylene oxide to produce the corresponding polyoxypropanol which was subsequently condensed with an equimole ratio of lauric acid to produce the ester amide of the polypropyloxy high molecular weight compound as a foam inhibiting agent.

Example XV

One mole of amino ethyl ethanolamine was condensed with one half mole of stearic anhydride to produce the mono amide and this reaction product was condensed with 20 moles of ethylene oxide in the presence of a solid sodium hydroxide catalyst to produce the poly ethoxy ethanol derivative, which reaction product was further condensed with one mole of stearic acid to produce the compound represented in Formula #11 above, an excellent foam inhibiting compound.

Example XVI

One mole of polyalkylene glycol mono ether designated as Carbide and Carbon

"Ucon–50–HB–260"

was condensed with one mole of stearic acid to produce the ester ether. This compound when tested in the high pressure laboratory boiler gave excellent foam inhibition.

Example XVII

Condensed one mole diethylenetriamine with 2 moles of stearic acid at a temperature of approximately 180° C. for 7 hours to produce the diamide. The reaction product is thereupon condensed with 15 moles of ethylene oxide to produce the ethoxy ethanol derivative, which is an excellent anti-foam compound for high pressure steam boilers as well as for atmospheric foam inhibition.

Example XVIII

The reaction product described in Example 17 is next condensed with acetic acid to produce the corresponding ester which increases the dispersibility of the reaction product and produces a more versatile foam inhibiting agent. The formula for the resulting compound is illustrated in Formula 17 above.

The compounds described above may be incorporated into conventional foam inhibiting compositions including substances such as tannin and lignin derivatives, the proportion of the active foam inhibiting compound to the total formula normally being within the range from 1% to 10% by weight. The foam inhibitor may be mixed with tannin and lignin derivatives in water solutions and passed through a colloid mill to produce a stable emulsion, which may be directly added to the boiler feed water or to the material already present in the boiler. The amount of material used depends essentially upon the system into which it is incorporated, but normally from ¼ part per million to 50 parts per million or more of the active foam inhibiting compound should be incorporated into the foaming system. The addition of the compound to the system is repeated when necessary to maintain a non-foaming condition.

The foam inhibitor may also be added as a solution in an appropriate solvent, for example, iso-propyl alcohol rather than in an emulsion form.

The foam inhibiting agents described above may also be used in conjunction with dispersing agents, particularly the non-foaming wetting agents such as the alkyl sulfates, alkyl sulfonates, and alkylaryl sulfonates. The addition of such wetting agents is especially advantageous where the foam inhibitors are to be used in the presence of calcium and/or magnesium ions in the aqueous foam system.

As compositions of matter the compounds of this invention suggest utility as lubricants for machinery and mechanical appliances, internal combustion engines, etc., as well as a lubricant for rubber and compositions to prevent unwanted adherence of such materials during fabrication of subsequent thereto. Also, the compounds of this invention have utility as hydraulic fluids for various applications in industry, such as for hydraulic power transmissions, magnetic fluid bases and compositions of hydraulic muds used for well drilling in petroleum fields. Also, some of these compositions will be useful for breaking water emulsions in petroleum oils. Also, these compounds suggest utility as flotation agents for separation of special materials and substances. In fact, the compositions of this invention have suggested uses wherever a modified surface active agent is called for in science or industry, such as an additive in the processing of textiles and fibres as an anti-static agent, etc.

It will be understood that modifications and variations may be effected without departing from the scope of the novel concepts of the present invention.

I claim as my invention:

1. A compound adapted to inhibit foaming tendencies in aqueous systems comprising a molecule having a plurality of interconnected alkylene-oxy groups interlinked with an acetal group and having a terminal polar group having attached thereto a hydrocarbon chain of at least 4 carbon atoms.

2. A compound adapted to inhibit foaming tendencies in aqueous systems comprising a molecule having a total of at least 25 alkylene-oxy groups interlinked with an acetal group and having a terminal nitrogen-containing hydrophilic group having a hydrocarbon chain of at least 11 carbon atoms attached thereto.

3. A compound adapted to inhibit foaming tendencies in aqueous systems comprising a molecule having a total of at least 25 alkylene-oxy groups interlinked with an acetal group having at least 8 carbon atoms and having terminal amide groups each having a hydrocarbon chain of at least 11 carbon atoms attached thereto.

4. A compound adapted to inhibit foaming tendencies in liquid systems comprising a molecule prepared by reacting a polyglycol having a molecular weight of at least 1,200 with an aldehyde to form a polyglycol acetal, and esterifying the resulting acetal with a carboxylic acid.

5. A compound adapted to inhibit frothing comprising a molecule having a pair of spaced polar groups each having a hydrocarbon chain of at least 4 carbon atoms attached thereto, said spaced polar groups being separated by a plurality of alkylene-oxy groups.

6. A compound adapted to inhibit frothing comprising a molecule having a pair of spaced ether groups each having a hydrocarbon chain of at least 4 carbon atoms attached thereto, said spaced ether groups being separated by a plurality of alkylene-oxy groups and at least one acetal group.

7. A compound adapted to inhibit foaming comprising a molecule having a terminal N-containing hydrophilic group selected from the group consisting of amine and amide groups, and a terminal ester group separated by a plurality of interlinked alkylene-oxy groups, each of said terminal groups having a hydrocarbon chain of at least 11 carbon atoms attached thereto.

8. A compound adapted to inhibit foaming comprising a molecule having a terminal N-containing hydrophilic group selected from the group consisting of amine and amide groups, and a terminal ether group separated by a plurality of interlinked alkylene-oxy groups, each of said terminal groups having a hydrocarbon chain of at least 4 carbon atoms attached thereto.

9. A compound adapted to inhibit foaming comprising a molecule having a pair of terminal amide groups each containing a hydrocarbon chain of at least 11 carbon atoms separated by a plurality of interlinked alkylene-oxy groups.

10. A compound adapted to inhibit foaming comprising a molecule having a pair of spaced ether groups each having a hydrocarbon chain of at least 4 carbon atoms attached thereto, said spaced ether groups being separated by a total of at least 40 alkylene-oxy groups and at least one acetal group.

11. A compound adapted to inhibit foaming comprising a molecule having terminal ester groups separated by a total of at least 25 alkylene-oxy groups, each of said terminal groups having a hydrocarbon chain of at least 4 carbon atoms attached thereto.

12. A compound adapted to inhibit foaming in aqueous systems comprising a molecule having a pair of spaced polar groups each having a hydrocarbon chain of at least 4 carbon atoms attached thereto, said spaced polar groups being separated by chains of alkylene-oxy groups interconnected through an acetal group.

13. A compound adapted to inhibit foaming in aqueous systems comprising a polyalkylene polyamine having both of its terminal nitrogen atoms acylated with a carboxylic acid containing a chain of at least 11 carbon atoms, and having an intermediate nitrogen atom carrying a plurality of interlinked alkylene-oxy groups.

14. A compound adapted to inhibit foaming in aqueous systems comprising a polyalkylene polyamine having both of its terminal nitrogen atoms acylated with a carboxylic acid containing a chain of at least 11 carbon atoms, and having an intermediate nitrogen atom carrying a plurality of interlinked alkylene-oxy groups esterified with a carboxylic acid.

15. A compound adapted to inhibit foaming, said compound comprising a molecule having terminal polar groups each having a hydrocarbon chain of at least 4 carbon atoms, one of said terminal groups being joined to the remainder of the molecule by an ether linkage, said terminal groups being separated in said molecule by a plurality of alkylene-oxy groups.

LEWIS O. GUNDERSON.

REFERENCES CITED

The following references are of record in the file of this patent:

UNITED STATES PATENTS

| Number | Name | Date |
|---|---|---|
| 2,114,122 | Bruson | Apr. 12, 1938 |
| 2,461,730 | Gunderson | Feb. 15, 1940 |
| 2,250,407 | Dermoote | July 22, 1941 |
| 2,379,703 | Geltner | July 3, 1945 |
| 2,408,527 | Monson | Oct. 1, 1946 |
| 2,481,899 | Bird | Sept. 13, 1949 |

FOREIGN PATENTS

| Number | Country | Date |
|---|---|---|
| 568,318 | Great Britain | of 1945 |